March 12, 1963 G. WIGGERMANN 3,080,854
HYDRAULIC PISTON MACHINE
Filed Aug. 6, 1957

United States Patent Office 3,080,854
Patented Mar. 12, 1963

3,080,854
HYDRAULIC PISTON MACHINE
Georg Wiggermann, Kressbronn, Germany, assignor of one-half to Walter Reiners, Monchen-Gladbach, Germany
Filed Aug. 6, 1957, Ser. No. 676,667
Claims priority, application Germany Aug. 9, 1956
8 Claims. (Cl. 121—62)

My invention relates to hydraulic piston machines operable as motors or pumps, and particularly to machines of the type having a rotating multi-cylinder structure with reciprocable pistons that rotate together with the cylinder structure.

In comparison with the conventional driving and working machines, the known hydraulic machines have a relatively low permissible speed of continuous operation. This applies particularly to the above-mentioned machines whose cylinders rotate together with the reciprocating pistons. If in such machines the pistons are reciprocable in parallel or similar relation to the axis of cylinder rotation, the pistons are subjected to centrifugal forces which increase with the square of the rotating speed and impose corresponding stresses upon the gliding surfaces between pistons and cylinders. In machines with radially reciprocating pistons, there occurs the equally detrimental Coriolis force. Centrifugal force as well as Coriolis force cause increased friction and wear at the gliding surfaces of the pistons and the cylinder structure. Simultaneously, at high rotating speeds, the forces required for the piston stroke movements produce additional inertia forces which must be taken up by the drive means of the machine and thus also increase wear. In many cases of application it is therefore necessary to use an additional speed-change transmission between the hydraulic machine and the driven or driving devices for adapting the machine speed to the low permissible maximum.

Relating to hydraulic machines of the above-mentioned type, it is an object of my invention to afford an increase in rated speed of continuous operation. A more specific object of the invention is to cope with one of the difficulties encountered with such increase in speed, namely the above-mentioned forces of acceleration for the purpose of reducing the friction and wear between mutually gliding surfaces of the machine components.

In view of the above-mentioned operating conditions it has already become customary to give the pistons, which because of the required great strength and high surface hardness at the frictionally stressed localities have in most cases been made of steel, a hollow design wherever applicable. However, the advantage of reducing weight thus attained is accompanied by hydraulic disadvantages due to the fact that the liquid working medium also fills the hollow space of the piston thus increasing the dead space within the cylinder chamber. This reduces the volumetric efficiency of the machine to an undesired extent, particularly at high delivery pressure of the liquid medium.

The disadvantages entailed by the hollow design of the pistons is avoided by the present invention in that the piston is composed of a jacket of high surface hardness and a filler body enclosed within the jacket and having a specific weight (gravity) smaller than that of the jacket and an elasticity smaller than that of the liquid working medium.

It would be desirable for the purpose of the invention to make the wall thickness of the high-gravity piston jacket as small as possible. On the other hand, the tight sliding fit of the piston within the cylinder space required under high liquid pressure would be endangered by the increased radial elasticity of such a thin jacket. Therefore, in order to permit a reduction in weight by minimizing the jacket wall thickness as much as possible, it is another feature of the present invention to provide a slight clearance between the filler body and the piston jacket, such clearance extending peripherally around the filler body particularly within the range of the axial piston side facing the cylinder port for the entrance of the oil or other liquid medium. The peripheral interspace between filler body and piston jacket is kept in communication with the pressure space of the cylinder. As a result, the pressure of the working medium imposes within this range of the piston wall a load that acts outwardly in the radial direction and thus opposes and compensates the pressure acting exteriorly upon the piston in radial direction toward the piston axis.

According to still another feature of my invention, the filler body is utilized for further reduction of the detrimental dead cylinder space. To this end, the filler body is provided on the above-mentioned port side of the cylinder space with an expeller nose which protrudes axially from the piston and fills further dead spaces of the cylinder in the port area.

Aside from hydraulically relieving the piston wall, the interstitial gap accessible to the working liquid between filler body and piston jacket has the further advantage that the filler body, preferably made of light metal, cannot affect the fit of the piston within the cylinder bore by its large temperature-responsive expansion due to the occurring high temperatures of the liquid working medium.

According to a still further feature of the invention, also aiming at minimizing the piston weight, the piston in a hydraulic machine of the above-mentioned type is made of a material of slight gravity but sufficiently high elasticity, such as aluminum, magnesium or their alloys, and is provided with a hollow outer shell of hard metal, for instance hard chromium or chromium alloy to form the above-mentioned piston jacket.

Such a design of the piston results in smallest possible weight and thus in most favorable conditions relative to centrifugal and inertia forces encountered at high rotating speeds.

The hard chromium coating, used according to the invention instead of a piston jacket of steel, is just as well suitable as steel to minimize wear as well as the danger of freezing.

However, attainment of the just-mentioned advantages encounters the difficulty that a piston of the last-mentioned kind may again be affected by such undesirably large variations of the fitting clearance between piston and cylinder as may be caused by the working temperature due to the large coefficient of expansion of the light metals.

However, in order to permit employing the particularly favorable piston design according to the last-mentioned features without entailing such disadvantages, the cylinder body, that is the rotating drum which comprises the cylinder bores, is preferably made of a material having a temperature coefficient of expansion at least as large as that of the piston material. That is, the cylinder body is preferably made of the same light metal as the main body of the jacketed pistons. As a result, the hydraulic machine according to the invention maintains a substantially constant diametrical clearance of the pistons within the cylinders at all operating temperatures.

The above-described manufacture of the cylinder drum from a material having the same properties as the piston material and consisting, for instance, of light metal, involves the same difficulties, due to the relatively low hardness of such materials, as are encountered with pistons without the hard chromium jacket. In order to also eliminate this obstacle, and in accordance with a further feature of the invention, the gliding surfaces or races between the cylinder body and the normally stationary control member are provided with a coating of hard metal such as hard chromium or chromium alloy. The design of the pistons of light metal, in all embodiments of the invention, requires a careful design of the gliding surfaces or races that transmit the piston forces to or from the pistons. According to another feature of the invention, therefore, these gliding surfaces or races are also provided with a coating of hard metal, for instance hard chromium.

The above-mentioned objects, advantages and features of the invention will be more fully understood from the embodiments illustrated by way of example on the accompanying drawing in which.

Figure 1:
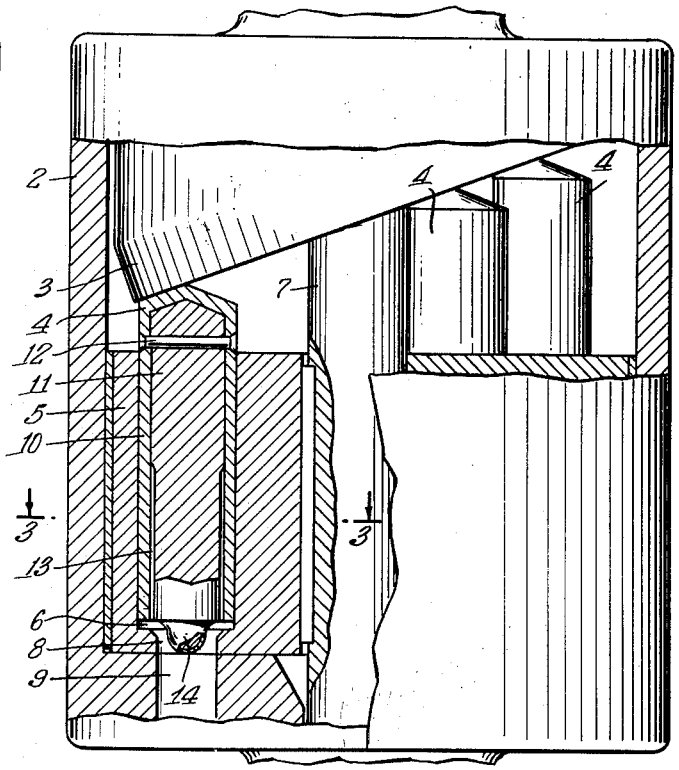
FIG. 1 is a longitudinal section through an axial piston machine.
Figure 3:
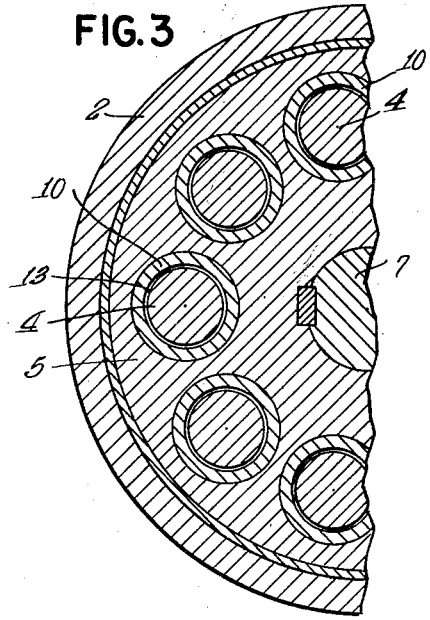
FIG. 3 is a cross section along the line 3—3 in FIG. 1.

The machine illustrated in FIGS. 1 and 3 comprises a stationary housing 2 equipped with a slanting control disc 3. The control disc is engaged by a number of peripherally distributed pistons 4 which are axially displaceable in respective cylinder bores 6 of a cylinder structure 5 of drum shape. The cylinder structure 5 is rotatably mounted in housing 2 and is in driving connection with the machine shaft 7 likewise journalled in the housing.

The cylinder structure 5 has port openings 8 which are axially aligned with the respective cylinder bores 6 and serve for supplying and discharging the liquid working medium, preferably oil, to and from the variable-volume spaces formed by the pistons together with the respective cylinder bores. The ports 8 communicate with control slots 9 in the stationary housing 2 which are in connection with oil lines attached to the housing.

The pistons 4 are hollow hard shells filled with light filler bodies. They are formed by a piston jacket 10 of steel into which a filler body 11 is inserted. The filler body 11 consists of a material of lower gravity than the jacket material. Suitable for the filler body are light metals such as aluminum, magnesium and alloys thereof. The filler body 11 is fixed within the piston jacket by suitable means, for instance with the aid of a cross pin 12. Located between the jacket 10 and the filler body 11 is an oil gap 13 formed by a slight peripheral clearance between filler body and jacket. The peripheral gap 13 is continuously in communication with the cylinder space 6 so that the pressure within the gap 13 corresponds to the operating pressure of the liquid medium.

On the port side of the piston the filler body 11 is provided with an expeller nose 14 which, in the lower dead center position of the piston, protrudes from the piston into the port opening 8 to such an extent that a sufficient flow of oil is still possible. When the piston moves to the inner dead-center position, the nose 14 penetrates into the control opening 8 only during the last portion of this movement, so that the oil velocity according to the reduced piston speed is already so small that the flow resistance occurring is negligible.

Figure 2:
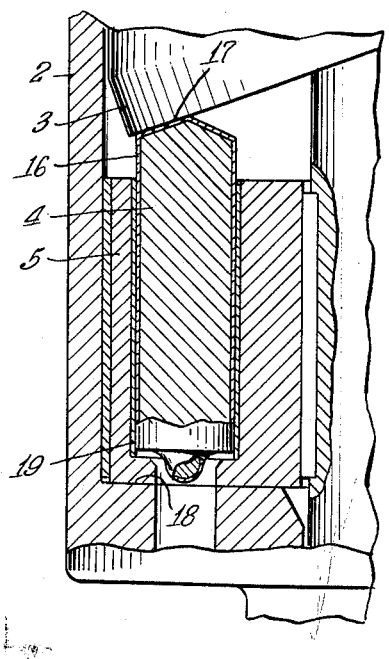
FIG. 2 is a partial axial section through another embodiment of such a machine.

The embodiment illustrated in FIG. 2 differs from that of FIG. 1 by the fact that the piston 4 is almost entirely formed of a low-gravity material, for instance one of the above-mentioned light metals, and possesses a surface coating 16 of hard metal, for instance hard chromium or chromium alloy instead of the above-described steel jacket. The hard coating covers the entire piston surface including the faces 17 which glide along the race way on the slanting control disc 3 and serve for transmitting the piston forces. The control surface 18 of the cylinder drum 5 is likewise covered by a coating of hard metal, for instance hard chromium, likewise the cylindrical surface 19 of the cylinder bore.

It will be understood by those skilled in the art upon a study of this disclosure, that the invention is not limited to the particular embodiments illustrated on the drawing. The described design of the piston is analogously applicable, for instance, with pistons which are linked through piston rods or pitman members with a driving or driven disc in the manner known for hydraulic machines of this general type. In such cases the piston rods are preferably joined with the respective filler bodies by means of interengaging screw threads which are preferably also used for fixing the filler body within the piston jacket. In such designs, having the pistons consist essentially of light metal and coated with a hard layer at the gliding surfaces, the gliding surfaces at the linkage points of the driving or driven disc are likewise covered by a coating of hard metal, for instance hard chromium. The invention is similarly applicable to hydraulic piston machines with radially arranged pistons.

I claim:

1. A hydraulic piston machine, comprising a cylinder structure and a piston forming together therewith a variable-volume chamber for a liquid working medium in said chamber, said piston having an outer jacket of great surface hardness and a filler body of less hardness and lower specific gravity than said jacket, said filler body being enclosed by said jacket and forming between said jacket and said filler body a peripheral interstice communicating with said chamber.

2. A hydraulic piston machine, comprising a cylinder structure and a piston forming together therewith a variable-volume chamber for a liquid working medium in said chamber, said piston having an outer jacket of great surface hardness and a solid filler body of lesser hardness enclosed within said jacket and filling the major portion of the enclosed space within said jacket both as to diameter and length thereof, said filler body having lower specific gravity than said jacket and having an elasticity smaller than that of said liquid medium, said cylinder structure having a port communicating with said chamber for supplying said liquid medium thereto, said port being located at one axial side of said piston, said filler body having an expeller nose protruding from said piston on said one axial side and entering into the port area of said cylinder structure, said cylinder structure consisting of a material having a temperature coefficient of expansion at least equal to that of said filler body.

3. In a hydraulic piston machine having a housing, a cylinder structure rotatable in said housing and a number of cylinder bores distributed about the axis of rotation of said structure, pistons reciprocable in said respective bores and each forming a variable-volume chamber together with said cylinder structure, a stationary control member in said housing having a race-way surface engaged by said pistons to transmit piston-stroke forces, said cylinder structure having ports communicating with said respective bores for the passage of liquid working medium, the combination wherein each of said pistons is provided with a jacket of great surface hardness and a filler body of less hardness and lower specific gravity than said jacket, said filler body filling the major portion of the interior volume of said jacket and forming between said jacket and said filler body a peripheral interstice communicating with said chamber.

4. In a hydraulic piston machine having a housing, a cylinder structure rotatable in said housing and a number of cylinder bores distributed about the axis of rotation of said structure, pistons reciprocable in said respective bores and forming a variable-volume chamber together with said cylinder structure, a stationary control member in said housing having a race-way surface engaged by said pistons to transmit piston-stroke forces, said cylinder strutture having ports communicating with said respective bores for the passage of liquid working medium, the combination wherein each of said pistons is provided with a jacket and a filler body rigidly joined with and filling the major portion of the interior volume of said jacket, said jacket and said filler body forming between said jacket and said filler body a peripheral gap communicating with said chamber at the port side of said piston.

5. In a hydraulic piston machine having a housing, a cylinder structure rotatable in said housing and a number of cylinder bores distributed about the axis of rotation of said structure, pistons reciprocable in said respective bores and forming a variable-volume chamber together with said cylinder structure, a stationary control member in said housing having a race-way surface engaged by said pistons to transmit piston-stroke forces, said cylinder structure having ports communicating with said respective bores for the passage of liquid working medium, the combination wherein each of said pistons is provided with a jacket and a filler body rigidly joined with and filling the major portion of the interior volume of said jacket, said jacket and said filler body forming between said jacket and said filler body a peripheral gap communicating with said chamber at the port side of said piston, and each piston having an expeller nose mounted on said port side thereof and of a material of lower specific gravity than that of said jacket, said nose being located partly in said port when the volume of said chamber has minimum value, whereby said expeller nose serves to efficiently expel residual fluid from said chamber as said nose approaches and extends into one of said ports.

6. A hydraulic piston machine, comprising a cylinder structure and a piston forming together therewith a variable-volume chamber for a liquid working medium in said chamber, said piston having a hollow outer jacket of great surface hardness and a filler body of small hardness enclosed within said jacket and filling the major portion of the enclosed space within said hollow jacket, said filler body having lower specific gravity than said jacket and having an elasticity smaller than that of said liquid medium, said cylinder structure having a port communicating with said chamber for supplying said liquid medium thereto, said port being located at one axial side of said piston, said jacket and said filler body forming between said jacket and said filler body a slight peripheral interspace extending over part of the axial piston length at said side and communicating with said chamber.

7. In a hydraulic piston machine according to claim 6, said filler body having an expeller nose protruding from said one piston on said axial side and entering into the port area of said cylinder structure, whereby said expeller nose serves to efficiently expel residual fluid from said chamber as said nose approaches and extends into one of said ports.

8. A hydraulic piston machine, comprising a cylinder structure and a piston forming together therewith a variable-volume chamber for a liquid working medium in said chamber, said piston having a hollow outer jacket of great surface hardness and a filler body of small hardness enclosed within said jacket and filling the major portion of the enclosed space within said hollow jacket, said filler body having lower specific gravity than said jacket and having an elasticity smaller than that of said liquid medium, said cylinder structure consisting of a material having a temperature coefficient of expansion at least equal to that of said filler body, said cylinder structure and said piston having mutually engaged gliding surfaces, and a hard-metal coating on each of said gliding surfaces.

References Cited in the file of this patent

UNITED STATES PATENTS

| | | |
|---|---|---|
| 152,541 | Winchester | June 30, 1874 |
| 968,969 | Ord | Aug. 30, 1910 |
| 1,167,975 | Burlingham | Jan. 11, 1916 |
| 1,441,568 | Wills | Jan. 9, 1923 |
| 1,804,066 | Smith | May 5, 1931 |
| 1,866,398 | Craig | July 5, 1932 |
| 2,073,710 | Rayfield | Mar. 16, 1937 |
| 2,340,169 | Arndt | Jan. 25, 1944 |
| 2,353,730 | Joy | July 18, 1944 |
| 2,410,405 | Cornelius | Nov. 5, 1946 |
| 2,573,863 | Mitchell | Nov. 6, 1951 |
| 2,694,383 | Larcen | Nov. 16, 1954 |

FOREIGN PATENTS

| | | |
|---|---|---|
| 390,420 | France | July 28, 1908 |